US012610253B2

(12) United States Patent
Puente Pestaña

(10) Patent No.: US 12,610,253 B2
(45) Date of Patent: Apr. 21, 2026

(54) NF DISCOVERY AND SELECTION BASED ON SERVICE RESPONSE LATENCY MEASUREMENTS

(71) Applicant: Telefonaktiebolaget LM Ericsson (publ), Stockholm (SE)

(72) Inventor: Miguel Angel Puente Pestaña, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 584 days.

(21) Appl. No.: 18/018,172

(22) PCT Filed: Jul. 31, 2020

(86) PCT No.: PCT/IB2020/057271
§ 371 (c)(1),
(2) Date: Jan. 26, 2023

(87) PCT Pub. No.: WO2022/023800
PCT Pub. Date: Feb. 3, 2022

(65) Prior Publication Data
US 2023/0269608 A1 Aug. 24, 2023

(51) Int. Cl.
*H04W 24/02* (2009.01)
*H04L 67/51* (2022.01)
(Continued)

(52) U.S. Cl.
CPC ............. *H04W 24/02* (2013.01); *H04L 67/51* (2022.05); *H04L 67/62* (2022.05); *H04W 24/10* (2013.01)

(58) Field of Classification Search
CPC ..... H04W 24/02; H04W 24/10; H04W 24/04; H04L 67/51; H04L 67/62
(Continued)

(56) References Cited

U.S. PATENT DOCUMENTS

| 2019/0075552 A1* | 3/2019 | Yu | H04W 24/10 |
| 2019/0215731 A1* | 7/2019 | Qiao | H04W 24/10 |

(Continued)

FOREIGN PATENT DOCUMENTS

| CN | 109479015 A | 3/2019 |
| CN | 109600761 A | 4/2019 |

(Continued)

OTHER PUBLICATIONS

Examination Report for European Patent Application No. 20753453.8, mailed Jan. 30, 2024, 8 pages.
(Continued)

*Primary Examiner* — Jungwon Chang
(74) *Attorney, Agent, or Firm* — Withrow & Terranova, PLLC

(57) ABSTRACT

Systems and methods for Network Function (NF) discovery and selection are disclosed. A method for NF discovery and selection comprises, at a consumer NF, receiving from a Network Data Analytics Function (NWDAF) an event subscription message for subscribing to the consumer NF; sending to a producer NF a service request for a particular service of the producer NF; receiving from the producer NF a service response with a service computing latency; and sending to the NWDAF an event notification message comprising a service response latency measurement based on the service computing latency, and identification information of the producer NF and/or the particular service of the producer NF. The method further comprises, at the NWDAF, computing a statistic latency value based on the service response latency measurement and sending to a Network Function Repository Function (NRF) a latency notification message including the identification information and the statistic latency value.

20 Claims, 8 Drawing Sheets

(51) Int. Cl.
*H04L 67/62* (2022.01)
*H04W 24/10* (2009.01)

(58) Field of Classification Search
USPC ........................................................ 370/252
See application file for complete search history.

(56) References Cited

U.S. PATENT DOCUMENTS

| | | | | |
|---|---|---|---|---|
| 2020/0228420 | A1 | 7/2020 | Dao et al. | |
| 2020/0260525 | A1* | 8/2020 | Gan | H04W 76/11 |
| 2021/0067480 | A1* | 3/2021 | Goel | H04L 61/10 |
| 2021/0250172 | A1* | 8/2021 | Choyi | H04L 9/3239 |
| 2022/0045924 | A1* | 2/2022 | Yao | H04W 12/037 |
| 2022/0159605 | A1* | 5/2022 | Li | H04W 76/10 |
| 2022/0272165 | A1* | 8/2022 | Bawa | H04L 61/4541 |

FOREIGN PATENT DOCUMENTS

| | | |
|---|---|---|
| CN | 111095970 A | 5/2020 |
| GB | 2593217 A | 9/2021 |
| WO | 2019032968 A1 | 2/2019 |
| WO | 2019158777 A1 | 8/2019 |
| WO | 2020108507 A1 | 6/2020 |

OTHER PUBLICATIONS

Author Unknown, "Technical Specification Group Services and System Aspects; Study on enablers for network automation for the 5G System (5GS); Phase 2 (Release 17)," Technical Specification 23.700-91, Version 0.4.0, Jun. 2020, 3GPP Organizational Partners, 186 pages.

Author Unknown, "Technical Specification Group Services and System Aspects; Architecture enhancements for 5G System (5GS) to support network data analytics services (Release 16)," Technical Specification 23.288, Version 16.4.0, Jul. 2020, 3GPP Organizational Partners, 66 pages.

Author Unknown, "Technical Specification Group Core Network and Terminals; 5G System; Network Function Repository Services; Stage 3 (Release 16)," Technical Specification 29.510, Version 16.4.0, Jul. 2020, 3GPP Organizational Partners, 192 pages.

Gulbrandsen, et al., "A DNS RR for specifying the location of services (DNS SRV)," Request for Comments 2782, Feb. 2000, The Internet Society, 12 pages.

Invitation to Pay Additional Fees and Partial Search for International Patent Application No. PCT/IB2020/057271, mailed Mar. 24, 2021, 18 pages.

International Search Report and Written Opinion for International Patent Application No. PCT/IB2020/057271, mailed May 18, 2021, 23 pages.

Feil, Li, et al., "Research and Design on the Overall Solutions of 5G Lightweight Core Network," Mobile Communications, vol. 1, 2020, China United Network Communications Co., Ltd, 5 pages.

Samsung, S2-2004546: "KI#8, New Sol: UE data as an input for Control Plane load balancing analytics," 3GPP SA WG2 Meeting #139E, Jun. 1-12, 2020, Electronic Meeting, 3 pages.

First Office Action for Chinese Patent Application No. 202080104528. 7, mailed Apr. 18, 2024, 15 pages.

* cited by examiner

NF DISCOVERY AND SELECTION BASED ON SERVICE RESPONSE LATENCY MEASUREMENTS

This application is a 35 U.S.C. § 371 national phase filing of International Application No. PCT/IB2020/057271, filed Jul. 31, 2020, the disclosure of which is incorporated herein by reference in its entirety.

TECHNICAL FIELD

The present disclosure relates to resolving Network Function (NF) discovery and selection in a cellular communications system and, in particular, to resolving the NF discovery and selection based on service response latency measurements.

BACKGROUND

Third Generation Partnership Project (3GPP) has defined the service-based architecture for the Fifth Generation (5G)

Core in the 5G system. In Release 15, the service framework consists of Network Function (NF) service consumers and NF service producers. A Network Resource Function (NRF) holds the registry for all services an NF producer has. NF producers, as NF consumers to the NRF, register their NF profile in the NRF. The NF profile contains NF specific information, service instances, addresses to the service instances, etc. (see 3GPP Technical Specification (TS) 29.510 for details). When a NF service consumer wants to access an NF service, the NF service consumer can discover the NF service in the NRF by sending a query. In the response to the query, the NRF includes all NF profiles that match the query. The NF consumer uses the result to select a NF instance and NF service instance. Once a NF service instance is selected, the NF service consumer communicates directly with the selected NF service producer instance.

3GPP TS 29.510 specifies that NF selection is based on the following information contained in the NF Profile/NF Service Profile data structures:

TABLE 6.1.6.2.2-1

| Definition of type NF Profile | | | | |
|---|---|---|---|---|
| Attribute name | Data type | P | Cardinality | Description |
| . . . | . . . | . . . | . . . | . . . |
| priority | integer | O | 0 . . . 1 | Priority (relative to other NFs of the same type) in the range of 0-65535, to be used for NF selection; lower values indicate a higher priority. Priority may or may not be present in the nfServiceList parameters, xxxInfo parameters and in this attribute. Priority in the nfServiceList has precedence over the priority in this attribute. which has precedence over the priority in xxxInfo parameter. (NOTE 4). The NRF may overwrite the received priority value when exposing an NFProfile with the Nnrf_NFDiscovery service. |
| capacity | integer | O | 0 . . . 1 | Static capacity information in the range of 0-65535, expressed as a weight relative to other NF instances of the same type; if capacity is also present in the nfServiceList parameters, those will have precedence over this value. (NOTE 4). |
| Load | integer | O | 0 . . . 1 | Dynamic load information, ranged from 0 to 100, indicates the current load percentage of the NF. |

(NOTE 4):
The capacity and priority parameters, if present, are used for NF selection and load balancing. The priority and capacity attributes shall be used for NF selection in the same way that priority and weight are used for server selection as defined in IETF RFC 2782 [23].

TABLE 6.1.6.2.3-1

| Definition of type NF Service Profile | | | | |
|---|---|---|---|---|
| Attribute name | Data type | P | Cardinality | Description |
| . . . | . . . | . . . | . . . | . . . |
| priority | integer | O | 0 . . . 1 | Priority (relative to other NFs of the same type) in the range of 0-65535, to be used for NF selection; lower values indicate a higher priority. Priority may or may not be present in the nfServiceList parameters, xxxInfo parameters and in this attribute. Priority in the nfServiceList has precedence over the priority in this attribute, which has precedence over the priority in xxxInfo parameter. (NOTE 4). The NRF may overwrite the received priority value when exposing an NFProfile with the Nnrf_NFDiscovery service. |

US 12,610,253 B2

3

4

TABLE 6.1.6.2.3-1-continued

Definition of type NF Service Profile

| Attribute name | Data type | P | Cardinality | Description |
|---|---|---|---|---|
| capacity | integer | O | 0 . . . 1 | Static capacity information in the range of 0-65535, expressed as a weight relative to other NF instances of the same type; if capacity is also present in the nfServiceList parameters, those will have precedence over this value. (NOTE 4). |
| load | integer | O | 0 . . . 1 | Dynamic load information, ranged from 0 to 100, indicates the current load percentage of the NF. |

NOTE 2:
The capacity and priority parameters, if present, are used for NF selection and load balancing. The priority and capacity attributes shall be used for NF selection in the same way that priority and weight are used for server selection as defined in IETF RFC 2782 [23].

Although not specified in 29.510, it is also a typical practice to consider the NF/NF service load information stored in NRF for NF/NF service selection and load balancing.

Current 3GPP solutions consider priority, capacity, and load information as the parameters for NF selection decisions, which entail the following problems:

Priority and capacity are static parameters that do not provide information on the dynamic behavior of the NF or the peculiarities of different NF implementations (e.g. different vendors);

Load information does not provide full information of the overall NF behavior, since a loaded NF can perform better than a lower loaded one (e.g. in terms of latency or throughput) if its implementation is optimized towards a quicker and more efficient operation; and Faulty or poorly optimized implementations should be avoided when it comes to NF discovery and selection. However, faulty or poorly optimized NFs cannot be detected using the existing parameters and solutions for NF selection.

SUMMARY

Systems and methods are disclosed herein for Network Function (NF) discovery and selection based on service response latency measurements. In one embodiment, a method for NF discovery and selection in a core network of a cellular communications system comprises, at a consumer NF that supports service response latency measurements, receiving from a Network Data Analytics Function (NWDAF) an event subscription message for subscribing to the consumer NF for the service response latency measurements, sending to a producer NF a service request for a particular service of the producer NF, receiving from the producer NF a service response with a service computing latency, and sending to the NWDAF an event notification message. The service computing latency indicates time elapsed since the service request is received by the producer NF until the service response is sent by the producer NF. The event notification message comprises a service response latency measurement that is based on the service computing latency provided with the service response received from the producer NF, and identification information that identifies the producer NF, the particular service of the producer NF, or both the producer NF and the particular service of the producer NF. The method further comprises, at the NWDAF, sending to the consumer NF the event subscription message for subscribing to the consumer NF for the service response latency measurements, receiving from the consumer NF the event notification message, computing at least one statistic latency value based on the service response latency measurement received from the consumer NF, and sending to a Network Function Repository Function (NRF) a latency notification message, which includes the identification information and the at least one statistic latency value. This NF discovery and selection procedure based on service response latency measurements enables preclusion of faulty or poorly optimized NF/NF service implementations at NF selection, enables selection of the best performing NFs/NF services in terms of latency for latency critical operations, and enables a consumer NF to trigger a new NF discovery to find producer NFs that have good latency performance, if a current producer NF starts malfunctioning and responding to service requests from the consumer NF with high latency.

In one embodiment, the method further comprises, at the consumer NF, obtaining a total service response latency measurement. The total service response latency measurement is a measurement of time elapsed since the service request is sent by the consumer NF until the service response is received by the consumer NF, and the event notification message further comprises the total service response latency.

In one embodiment, the method further comprises, at the NRF, receiving from the consumer NF a NF register message that includes an indication that the consumer NF supports service response latency measurements, sending to the NWDAF a latency subscription message for subscribing to the NWDAF for the computed at least one statistic latency value, receiving from the NWDAF a NF discovery message that includes an indication that eligible consumer NFs for NF discovery are consumer NFs that support service response latency measurements, and responsive to the NF discovery message, sending to the NWDAF a list of the eligible consumer NFs that support service response latency measurement, wherein the consumer NF is included in the list of the eligible consumer NFs.

In one embodiment, the method further comprises, at the NRF, receiving from the consumer NF a NF discovery request for the particular service, wherein the NF discovery request includes an indication that the consumer NF supports service response latency measurements, sending to the NWDAF a latency subscription message for subscribing to the NWDAF for the computed at least one statistic latency value, wherein the latency subscription message includes an address of the consumer NF, and sending to the consumer NF a discovery response including the identification information that identifies the producer NF, the particular service of the producer NF, or both the producer NF and the particular service of the producer NF.

In one embodiment, the at least one statistic latency value, which is computed based on the service response latency measurement received from the consumer NF, comprises: (a) an average service response latency, (b) a median service response latency, (c) a maximum service response latency, (d) a percentile service response latency, or (e) any two or more of (a)-(d).

In one embodiment, the event notification message sent from the consumer NF to the NWDAF further comprises an event identifier, which indicates that the service response latency measurement is included in the event notification message.

In one embodiment, a method of operation of a consumer NF that supports service response latency measurements in a core network of a cellular communications system comprises receiving from a NWDAF an event subscription message for subscribing to the consumer NF for service response latency measurements, sending to a producer NF a service request for a particular service of the producer NF, receiving from the producer NF a service response with a service computing latency, and sending to the NWDAF an event notification message. The service computing latency indicates time elapsed since the service request is received by the producer NF until the service response is sent by the producer NF. The event notification message comprises a service response latency measurement that is based on the service computing latency provided with the service response received from the producer NF, and identification information that identifies the producer NF, the particular service of the producer NF, or both the producer NF and the particular service of the producer NF. In one embodiment, the method further comprises obtaining a total service response latency measurement. The total service response latency measurement is a measurement of time elapsed since the service request is sent by the consumer NF until the service response is received by the consumer NF, and the event notification message further comprises the total service response latency. In one embodiment, the event notification message sent to the NWDAF further comprises an event identifier, which indicates that the service response latency measurement is included in the notification message.

In one embodiment, the method further comprises sending a NRF a NF register message that includes an indication that the consumer NF supports service response latency measurements, and receiving from the NRF an acknowledgement message to acknowledge registration of the consumer NF.

In one embodiment, the method further comprises sending a NRF a NF discovery request for the particular service, wherein the NF discovery request includes an indication that the consumer NF supports service response latency measurements, and receiving from the NRF a discovery response including the identification information that identifies the producer NF, the particular service of the producer NF, or both the producer NF and the particular service of the producer NF.

Corresponding embodiments of a consumer NF for a core network of a cellular communications system are also disclosed. In one embodiment, the consumer NF is adapted to receive from a NWDAF an event subscription message for subscribing to the consumer NF for service response latency measurements, send to a producer NF a service request for a particular service of the producer NF, receive from the producer NF a service response with a service computing latency, and send to the NWDAF an event notification message. The service computing latency indicates time elapsed since the service request is received by the producer NF until the service response is sent by the producer NF. The event notification message comprises a service response latency measurement that is based on the service computing latency provided with the service response received from the producer NF, and identification information that identifies the producer NF, the particular service of the producer NF, or both the producer NF and the particular service of the producer NF.

In one embodiment, a network node that implements a consumer NF for a core network of a cellular communications system comprises a network interface and processing circuitry associated with the network interface. The processing circuitry is configured to cause the network node to receive from a NWDAF an event subscription message for subscribing to the consumer NF for service response latency measurements, send to a producer NF a service request for a particular service of the producer NF, receive from the producer NF a service response with a service computing latency, and send to the NWDAF an event notification message. The service computing latency indicates time elapsed since the service request is received by the producer NF until the service response is sent by the producer NF. The event notification message comprises a service response latency measurement that is based on the service computing latency provided with the service response received from the producer NF, and identification information that identifies the producer NF, the particular service of the producer NF, or both the producer NF and the particular service of the producer NF.

In one embodiment, a method of operation of a NWDAF in a core network of a cellular communications system comprises sending to a consumer NF an event subscription message for subscribing to the consumer NF for service response latency measurements, and receiving from the consumer NF an event notification message. The event notification message comprises a service response latency measurement, and identification information that identifies a producer NF, a particular service of the producer NF, or both the producer NF and the particular service of the producer NF. In one embodiment, the method further comprises computing at least one statistic latency value based on the service response latency measurement received from the consumer NF, and sending to a NRF a latency notification message, which includes the identification information and the at least one statistic latency value. In one embodiment, the at least one statistic latency value, which is computed based on the service response latency measurement received from the consumer NF, comprises: (a) an average service response latency, (b) a median service response latency, (c) a maximum service response latency, (d) a percentile service response latency, or (e) any two or more of (a)-(d). In one embodiment, the event notification message received from the consumer NF further comprises an event identifier, which indicates that the service response latency measurement is included in the notification message.

In one embodiment, the method further comprises receiving from the NRF a latency subscription message for subscribing to the NWDAF for the computed at least one statistic latency value, sending to the NRF a NF discovery message that includes an indication that eligible consumer NFs for NF discovery are consumer NFs that support service response latency measurements, and receiving from the NRF a list of the eligible consumer NFs that support service response latency measurement, wherein the consumer NF is included in the list of the eligible consumer NFs.

In one embodiment, the method further comprises receiving from the NRF a latency subscription message for subscribing to the NWDAF for the computed at least one statistic latency value. The latency subscription message includes an address of the consumer NF.

Corresponding embodiments of an NWDAF for a core network of a cellular communications system are also disclosed. In one embodiment, the NWDAF is adapted to send to a consumer NF an event subscription message for subscribing to the consumer NF for the service response latency measurements, and receive from the consumer NF an event notification message. The event notification message comprises a service response latency measurement, and identification information that identifies the producer NF, the particular service of the producer NF, or both the producer NF and the particular service of the producer NF.

In one embodiment, a network node that implements a NWDAF for a core network of a cellular communications system comprises a network interface and processing circuitry associated with the network interface. The processing circuitry is configured to cause the network node to send to a consumer NF an event subscription message for subscribing to the consumer NF for the service response latency measurements, and receive from the consumer NF an event notification message. The event notification message comprises a service response latency measurement, and identification information that identifies the producer NF, the particular service of the producer NF, or both the producer NF and the particular service of the producer NF.

In one embodiment, a method for discovering producer NFs with certain service response latency requirements in a cellular communications system comprises, at a consumer NF, sending a NF discovery request to a NRF, wherein the NF discovery request includes at least one service response latency requirement, receiving a discovery response from the NRF, and sending a service request to a producer NF. Herein, the discovery response includes identification information that identifies at least one producer NF that fulfills the at least one service response latency requirement, a particular service of the at least one producer NF that fulfills the at least one service response latency requirement, or both the at least one producer NF that fulfills the at least one service response latency requirement and the particular service of the at least one producer NF that fulfills the at least one service response latency requirement. The producer NF that receives the service request is included among the at least one producer NF which itself or the particular service of which fulfills the at least one service response latency requirement. The method further comprises, at the NRF, receiving the NF discovery request from the consumer NF, determining the at least one producer NF that fulfills the at least one service response latency requirement, the particular service of the at least one producer NF that fulfills the at least one service response latency requirement, or both the at least one producer NF that fulfills the at least one service response latency requirement and the particular service of the at least one producer NF that fulfills the at least one service response latency requirement, and sending the discovery response to the consumer NF.

In one embodiment, the at least one service response latency requirement indicates a maximum allowed value of the service response latency for one producer NF.

In one embodiment, the at least one service response latency requirement indicates that the consumer NF should send the service request to a producer NF, which has a lower service response latency than at least another producer NF.

In one embodiment, the at least one service response latency requirement includes a requirement of a service computing latency. The service computing latency indicates time elapsed since the service request is received by a producer NF until a service response is sent by the producer NF. The requirement of the service computing latency indicates a maximum allowed value of the service computing latency.

In one embodiment, the at least one service response latency requirement includes a requirement of a total service response latency. The total service response latency includes a service computing latency and a service transmission latency, wherein the service computing latency indicates time elapsed since the service request is received by a producer NF until a service response is sent by the producer NF, and the service transmission latency that indicates time elapsed since the service response is sent by the producer NF until the service response is received by the consumer NF. The requirement of the total service response latency indicates a maximum allowed value of the total service response latency.

In one embodiment, A method of operation of a consumer NF that supports service response latency measurements in a core network of a cellular communications system comprises sending a NF discovery request to a NRF, wherein the NF discovery request includes at least one service response latency requirement, receiving a discovery response from the NRF, and sending a service request to a producer NF. Herein, the discovery response includes identification information that identifies at least one producer NF that fulfills the at least one service response latency requirement, a particular service of the at least one producer NF that fulfills the at least one service response latency requirement, or both the at least one producer NF that fulfills the at least one service response latency requirement and the particular service of the at least one producer NF that fulfills the at least one service response latency requirement. The producer NF that receives the service request is included among the at least one producer NF which itself or the particular service of which fulfills the at least one service response latency requirement.

Corresponding embodiments of a consumer NF for a core network of a cellular communications system are also disclosed. In one embodiment, the consumer NF is adapted to send a NF discovery request to a NRF, wherein the NF discovery request includes at least one service response latency requirement, receive a discovery response from the NRF, and send a service request to a producer NF. Herein, the discovery response includes identification information that identifies at least one producer NF that fulfills the at least one service response latency requirement, a particular service of the at least one producer NF that fulfills the at least one service response latency requirement, or both the at least one producer NF that fulfills the at least one service response latency requirement and the particular service of the at least one producer NF that fulfills the at least one service response latency requirement. The producer NF that receives the service request is included among the at least one producer NF which itself or the particular service of which fulfills the at least one service response latency requirement.

In one embodiment, a network node that implements a consumer NF for a core network of a cellular communications system comprises a network interface and processing circuitry associated with the network interface. The processing circuitry is configured to cause the network node to send a NF discovery request to a NRF, wherein the NF discovery request includes at least one service response latency requirement, receive a discovery response from the NRF, and send a service request to a producer NF. Herein, the discovery response includes identification information that identifies at least one producer NF that fulfills the at least one service response latency requirement, a particular service of the at least one producer NF that fulfills the at least one service response latency requirement, or both the at least one producer NF that fulfills the at least one service response latency requirement and the particular service of the at least one producer NF that fulfills the at least one service response latency requirement. The producer NF that receives the service request is included among the at least one producer NF which itself or the particular service of which fulfills the at least one service response latency requirement.

In one embodiment, a method of operation of a NRF in a core network of a cellular communications system comprises receiving a NF discovery request from a consumer NF, wherein the NF discovery request includes at least one service response latency requirement, determining at least one producer NF that fulfills the at least one service response latency requirement, a particular service of the at least one producer NF that fulfills the at least one service response latency requirement, or both the at least one producer NF that fulfills the at least one service response latency requirement and the particular service of the at least one producer NF that fulfills the at least one service response latency requirement, and sending a discovery response to the consumer NF. The discovery response includes identification information that identifies the at least one producer NF that fulfills the at least one service response latency requirement, the particular service of the at least one producer NF that fulfills the at least one service response latency requirement, or both the at least one producer NF that fulfills the at least one service response latency requirement and the particular service of the at least one producer NF that fulfills the at least one service response latency requirement.

Corresponding embodiments of a NRF for a core network of a cellular communications system are also disclosed. In one embodiment, the NRF is adapted to receive a NF discovery request from a consumer NF, wherein the NF discovery request includes at least one service response latency requirement, determine at least one producer NF that fulfills the at least one service response latency requirement, a particular service of the at least one producer NF that fulfills the at least one service response latency requirement, or both the at least one producer NF that fulfills the at least one service response latency requirement and the particular service of the at least one producer NF that fulfills the at least one service response latency requirement, and send a discovery response to the consumer NF. The discovery response includes identification information that identifies the at least one producer NF that fulfills the at least one service response latency requirement, the particular service of the at least one producer NF that fulfills the at least one service response latency requirement, or both the at least one producer NF that fulfills the at least one service response latency requirement and the particular service of the at least one producer NF that fulfills the at least one service response latency requirement.

In one embodiment, a network node that implements a NRF for a core network of a cellular communications system comprises a network interface and processing circuitry associated with the network interface. The processing circuitry is configured to cause the network node to receive a NF discovery request from a consumer NF, wherein the NF discovery request includes at least one service response latency requirement, determine at least one producer NF that fulfills the at least one service response latency requirement, a particular service of the at least one producer NF that fulfills the at least one service response latency requirement, or both the at least one producer NF that fulfills the at least one service response latency requirement and the particular service of the at least one producer NF that fulfills the at least one service response latency requirement, and send a discovery response to the consumer NF. The discovery response includes identification information that identifies the at least one producer NF that fulfills the at least one service response latency requirement, the particular service of the at least one producer NF that fulfills the at least one service response latency requirement, or both the at least one producer NF that fulfills the at least one service response latency requirement and the particular service of the at least one producer NF that fulfills the at least one service response latency requirement.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
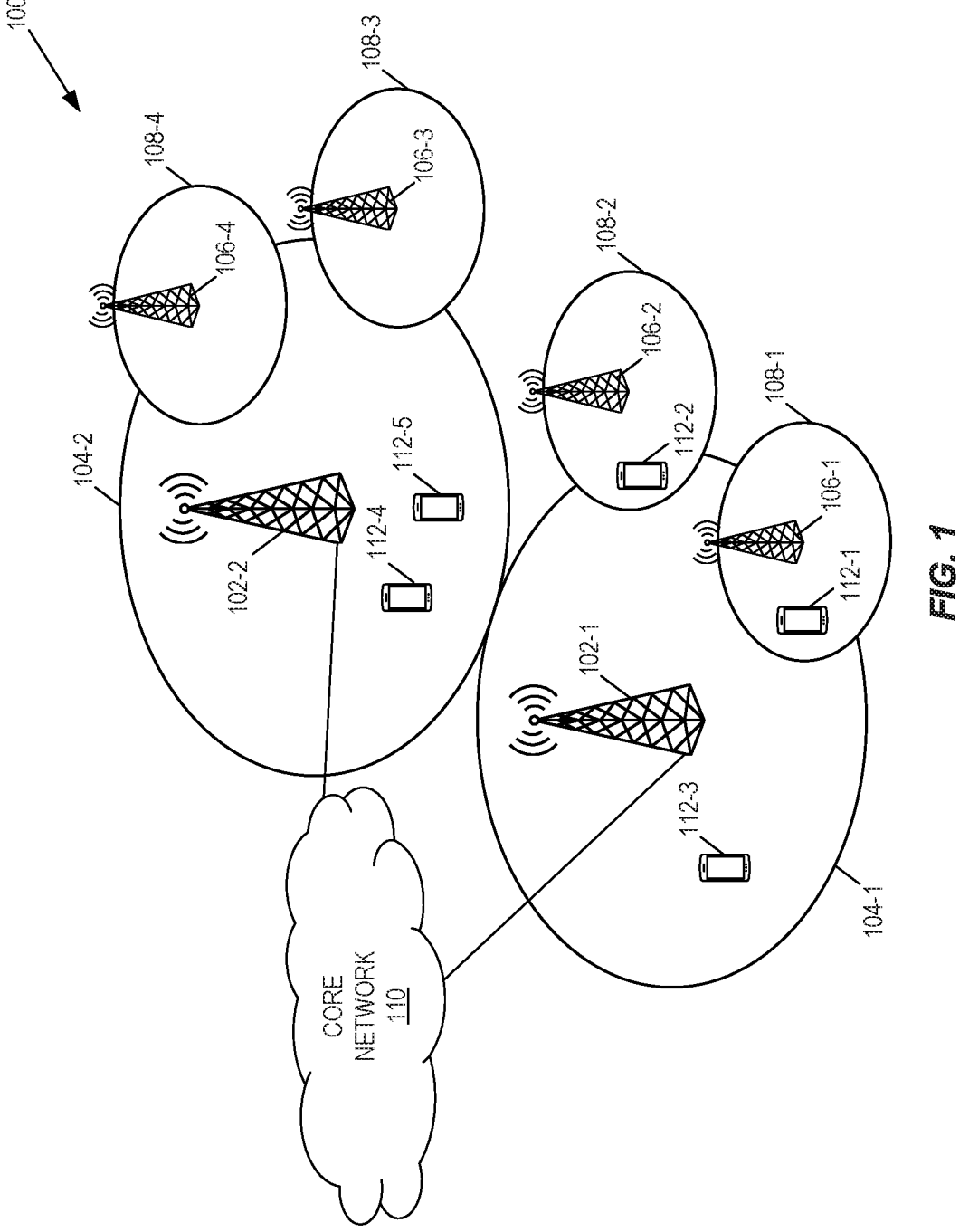
FIG. 1 illustrates one example of a cellular communications system according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) with respect to NF discovery and selection in a cellular communications system. Current 3GPP solutions consider priority, capacity, and load information as the parameters for NF selection decisions. However, priority and capacity are static parameters that do not provide information on the dynamic behavior of the NF or the peculiarities of different NF implementations (e.g. different vendors). Load information does not provide full information of the overall NF behavior, since a loaded NF can perform better than a lower loaded one (e.g. in terms of latency or throughput) if its implementation is optimized towards a quicker and more efficient operation. Furthermore, faulty or poorly optimized implementations should be avoided when it comes to NF discovery and selection. However, faulty or poorly optimized NFs cannot be detected using the existing parameters and solutions for NF selection.

Systems and methods are disclosed herein that address the aforementioned or other challenges with NF discovery and selection. The solution proposed herein is enabling NF discovery and selection based on service response latency measurements of NFs.

In some embodiments, the solution comprises the following features. Network Data Analytics Function (NWDAF) collects information on service response latency measurements of the different NF instances or different NF service instances. To that extent, when a consumer NF requests a service from a producer NF, the consumer NF measures service response latency and provides this measurement to the NWDAF. The NWDAF subscribes to consumer NFs for the purpose of receiving service response latency measurements.

Using the collected information, the NWDAF generates insights (e.g. average) on the service response latency measurements of the different NF instances or different NF service instances. The NWDAF can generate these insights in absolute terms (e.g. 10 ms) or in relative terms relative to different NF instances or different NF service instances (e.g. in the range of 0-65535, expressed as a weight relative to other NF instances or other NF service instances of the same type).

In some embodiments, the consumer NFs supporting service response time measurement capability, include the capability in their NF profile/NF service profile and provide it to NRF at NF register. Then, NWDAF can discover (from the NRF) the consumer NFs supporting this capability to collect the measurements.

In some embodiments, the NRF subscribes to NWDAF for the insights on the service response latency measurements of the different NF instances or different NF service instances, and includes the information in the NF profile/NF service profile.

In some embodiments, the consumer NFs may include in a NF discovery request an indication of the interest of the consumer NFs in discovering producer NFs or services of the producer NFs with low service response latency, e.g. in case of latency critical applications. The consumer NFs may indicate e.g. a maximum value for the service response latency in absolute or relative terms. Or the consumer NFs may request the producer NFs or the services of the producer NFs with lower service response latency available.

In some embodiments, the NRF checks the NF profiles or NF service profiles and selects the producer NFs or the services of the producer NFs according to the service response latency requirements.

3GPP TS 29.510 specifies that NF selection is based on the following information contained in the NFProfile/NF-Service data structures:

The solution proposed in the present disclosure extends the NF Profile/NF Service Profile data structures as follows:

| | | | | Definition of type NF Profile/NP Service Profile |
|---|---|---|---|---|
| Attribute name | Data type | P | Cardinality | Description |
| . . . | . . . | . . . | . . . | . . . |
| priority | integer | O | 0 . . . 1 | Priority (relative to other NFs of the same type) in the range of 0-65535, to be used for NF selection; lower values indicate a higher priority. Priority may or may not be present in the nfServiceList parameters, xxxInfo parameters and in this attribute. Priority in the nfServiceList has precedence over the priority in this attribute, which has precedence over the priority in xxxInfo parameter. (NOTE 4). The NRF may overwrite the received priority value when exposing an NFProfile with the Nnrf_NFDiscovery service. |
| capacity | integer | O | 0 . . . 1 | Static capacity information in the range of 0-65535, expressed as a weight relative to other NF instances of the same type; if capacity is also present in the nfServiceList parameters, those will have precedence over this value. (NOTE 4). |
| Load | integer | O | 0 . . . 1 | Dynamic load information, ranged from 0 to 100, indicates the current load percentage of the NF. |
| service response latency measurement support | bool | O | 0 . . . 1 | Indication that the NF supports service response latency measurement |
| service response latency | integer | O | 0 . . . 1 | Measuring service response latency (service computing latency) of the NF/NF service. It can be in absolute terms (e.g. 10 ms) or in relative terms relative to different NFs or NF services (e.g. in the range of 0-65535, expressed as a weight relative to other NF instances or NF service instances of the same type). |
| (Optional) Total service response latency | integer | O | 0 . . . 1 | Total service response latency (service computing latency + service transmission lantency) of the NF/NF service. It can be in absolute terms (e.g. 10 ms) or in relative terms relative to different NFs or NF services (e.g. in the range of 0-65535, expressed as a weight relative to other NF instances or NF service instances of the same type). |

(NOTE 4):
The capacity, priority, service response latency and total service response latency parameters, if present, are used for NF selection and load balancing. The priority and capacity attributes shall be used for NF selection in the same way that priority and weight are used for server selection as defined in IETF RFC 2782 [23].

Embodiments of the solution disclosed herein provide a number of advantages. For example, embodiments of the solution disclosed herein can detect and avoid faulty or poorly optimized NF/NF service implementations at NF selection. Embodiments of the solution disclosed herein can also select the best performing NFs/NF services in terms of latency for latency critical operations. Embodiments of the solution proposed herein can also enable a consumer NF to trigger a new NF discovery to find producer NFs that have good latency performance, if a current producer NF starts malfunctioning and responding to service requests from the consumer NF with high latency.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC); however, the embodi-ments disclosed herein are not limited to the 5GS. In this example, the NG-RAN includes base stations 102-1 and 102-2, which in the 5GS include NR base stations (gNBs) and optionally Next Generation eNBs (NG-eNBs) (e.g., LTE RAN nodes connected to the 5GC), controlling correspond-ing (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 control-ling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alterna-tively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
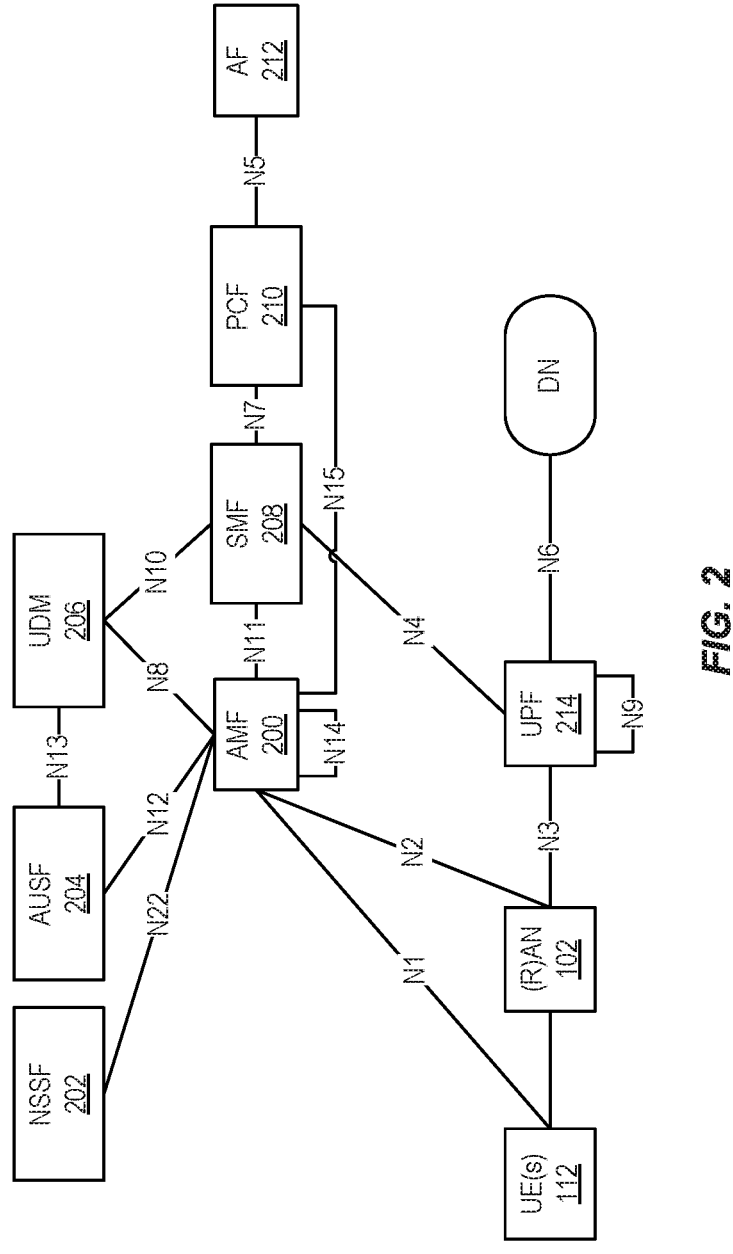
FIGS. 2 and 3 illustrate example embodiments in which the cellular communication system of FIG. 1 is a Fifth Generation (5G) System (5GS)

FIG. 2 illustrates a wireless communication system represented as a 5G network architecture composed of core NFs, where interaction between any two NFs is represented by a point-to-point reference point/interface. FIG. 2 can be viewed as one particular implementation of the cellular communications system 100 of FIG. 1.

Seen from the access side the 5G network architecture shown in FIG. 2 comprises a plurality of UEs 112 connected to either a (R)AN 102 or an Access Network (AN) as well as an AMF 200. Typically, the (R)AN 102 comprises base stations, e.g. such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and the AMF 200. The reference points for connecting between the AN 102 and the AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating User Plane (UP) and Control Plane (CP). The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
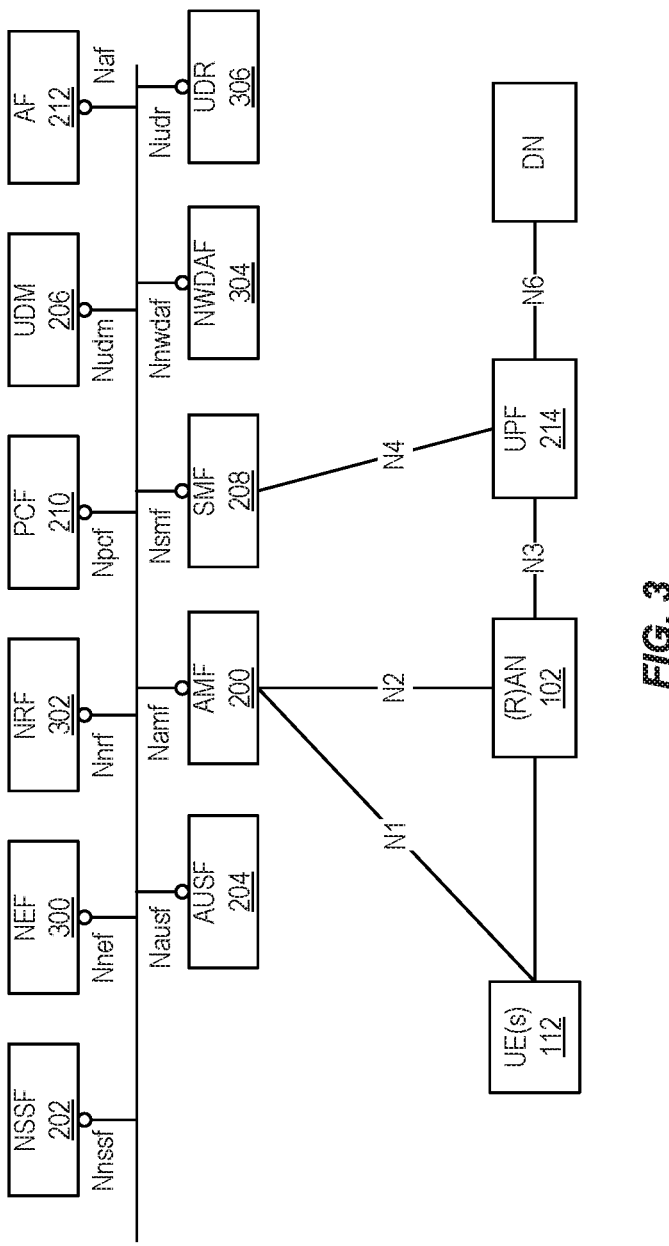

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support Quality of Service (QoS). Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4:
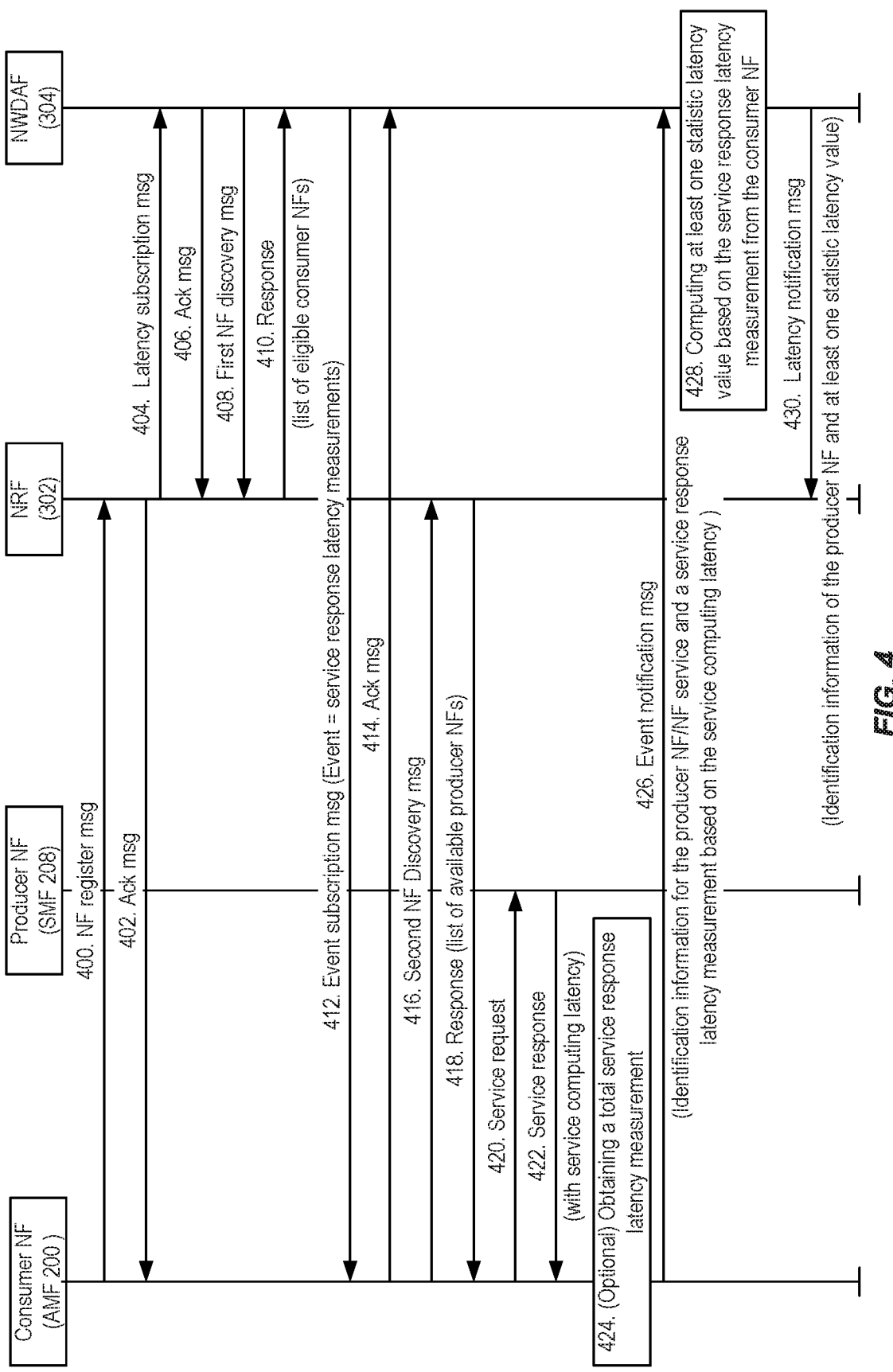
FIGS. 4 and 5 illustrate embodiments of solutions for Network Function (NF) discovery and selection based on service response latency measurements in accordance with some embodiments of the present disclosure.

Now, a description of some example embodiments of the present disclosure will be provided. FIG. 4 illustrates the operation of the cellular communications system 100 in accordance with one embodiment of the present disclosure in which NF discovery and selection is performed. As illustrated, a consumer NF 200, which in this example is an AMF in a core network 110 of a cellular communications system 100, sends a NF register message to a NRF 302 (step 400) for registering at the NRF 302. In this embodiment, the NF register message includes an indication that the consumer NF 200 supports service response latency measurements. The NRF 302 acknowledges the registration of the consumer NF 200 by sending an acknowledgement message to the consumer NF 200 (step 402).

In this embodiment, the NRF 302 sends a latency subscription message to a NWDAF 304 for subscribing to the NWDAF 304 (step 404) for obtaining from the NWDAF 304 at least one statistic latency value based on the service response latency measurements in a future step. The NWDAF 304 acknowledges the subscription requested by the NRF 302 by sending an acknowledgement message to the NRF 302 (step 406). Also, the NWDAF 304 sends a first NF discovery message to the NRF 302 (step 408). Herein, the first NF discovery message includes an indication that eligible consumer NFs for NF discovery are consumer NFs that support service response latency measurements. Responsive to the first NF discovery message, the NRF 302 sends a list of the eligible consumer NFs that support service response latency measurement to the NWDAF 304 (step 410). Herein, the consumer NF 200 is included in the list of the eligible consumer NFs.

In this embodiment, the NWDAF 304 sends an event subscription message to the consumer NF 200 for subscribing to the consumer NF 200 (step 412) for obtaining the service response latency measurements from the consumer NF 200 in a future step. Herein, the consumer NF 200 must support service response latency measurements. The NWDAF 304 may send the event subscription message to other consumer NF(s) in the list of the eligible consumer NFs. The consumer NF 200 acknowledges the subscription requested by the NWDAF 304 by sending an acknowledgement message to the NWDAF 304 (step 414).

In this embodiment, the consumer NF 200 sends a second NF discovery message to the NRF 302 for requesting available producer NFs (step 416). Responsive to the second NF discovery message, the NRF 302 sends a list of the available producer NFs to the consumer NF 200 (step 418). Then, the consumer NF 200 sends a service request for a particular service of a producer NF 208 in the list of the available producer NFs (step 420). In this example, the producer NF 208 may be a SMF in a core network 110 of a cellular communications system 100. Responsive to the service request, the producer NF 208 sends a service response with a service computing latency to the consumer NF 200 (step 422). The service computing latency indicates time elapsed since the service request is received by the producer NF 208 until the service response is sent by the producer NF 208.

In this embodiment, the consumer NF 200 optionally obtains a total service response latency measurement (step 424). Herein, the total service response latency measurement is a measurement of the service computing latency and a service transmission latency that indicates time elapsed since the service response is sent by the producer NF 208 until the service response is received by the consumer NF 200. As such, the total service response latency measurement is a measurement of time elapsed since the service request is sent by the consumer NF 200 until the service response is received by the consumer NF 200. Notice that if the service transmission latency is deemed to be negligible, the consumer NF 200 may measure the service computing latency at this step.

The consumer NF 200 then sends an event notification message to the NWDAF 304 (step 426). The event notification message includes identification information that identifies the producer NF 208, the particular service of the producer NF 208, or both the producer NF 208 and the particular service of the producer NF 208. The event notification message may also include the service response latency measurement that is based on the service computing latency provided with the service response received from the producer NF 208, or the total service response latency measurement that is based on both the service computing latency and the service transmission latency. Furthermore, the event notification message may also include an event identifier, which indicates that the service response latency measurement is included in the event notification message.

Based on the service response latency measurement or the total service response latency measurement in the event notification message, the NWDAF 304 computes at least one statistic latency value (step 428). The at least one statistic latency value may be an average service response latency on a per NF and NF service basis, (b) a median service response latency, (c) a maximum service response latency, (d) a percentile service response latency, or (e) any two or more of (a)-(d). Alternatively, the at least one statistic latency value may be a total average service response latency on a per NF and NF service basis, (b) a total median service response latency, (c) a total maximum service response latency, (d) a total percentile service response latency, or (e) any two or more of (a)-(d). The NWDAF 304 sends a latency notification message to the NRF 302 (step 430). The latency notification message includes the at least one statistic latency value based on the service response latency measurement or the total service response latency measurement, and the identification information identifying the producer NF 208, the particular service of the producer NF 208, or both the producer NF 208 and the particular service of the producer NF 208.

Figure 5:
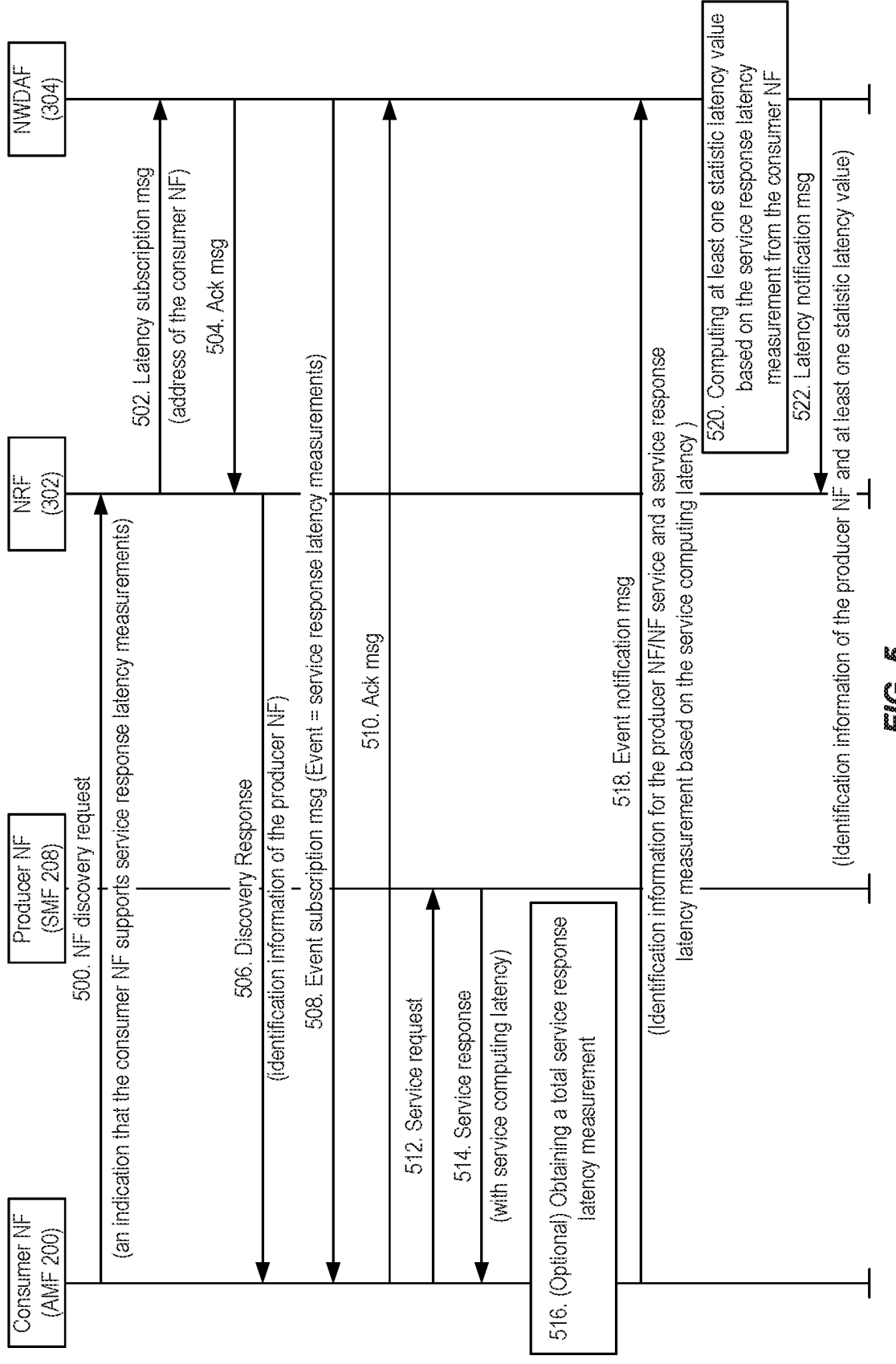

FIG. 5 illustrates the operation of the cellular communications system 100 in accordance with another embodiment of the present disclosure. As illustrated, a consumer NF 200, which in this example is an AMF in a core network 110 of a cellular communications system 100, sends a NF discovery request for a particular service to a NRF 302 (step 500). Herein, the NF discovery request includes an indication that the consumer NF 200 supports service response latency measurements. The NRF 302 sends a latency subscription message to a NWDAF 304 for subscribing to the NWDAF 304 (step 502) for obtaining from the NWDAF 304 at least one statistic latency value based on the service response latency measurements in a future step. The latency subscription message also includes an address of the consumer NF 200 providing to the NWDAF 304. Optionally, the latency subscription message may include identification information that identifies a producer NF 208, a particular service of the producer NF 208, or both the producer NF 208 and the particular service of the producer NF 208. In this example, the producer NF 208 may be a SMF in a core network 110 of a cellular communications system 100. The NWDAF 304 acknowledges the subscription requested by the NRF 302 by sending an acknowledgement message to the NRF 302 (step 504). The NRF 302 sends a discovery response to the consumer NF 200 (step 506). The discovery response sent by the NRF 302 includes the identification information that identifies the producer NF 208, the particular service of the producer NF 208, or both the producer NF 208 and the particular service of the producer NF 208.

In this embodiment, the NWDAF 304 sends an event subscription message to the consumer NF 200 for subscribing to the consumer NF 200 (step 508) for obtaining the service response latency measurements from the consumer NF 200 in a future step. Optionally, the event subscription message sent by the NWDAF 304 may include the identification information that identifies the producer NF 208, the particular service of the producer NF 208, or both the producer NF 208 and the particular service of the producer NF 208. The consumer NF 200 acknowledges the subscription requested by the NWDAF 304 by sending an acknowledgement message to the NWDAF 304 (step 510).

The consumer NF 200 sends a service request for the particular service of the producer NF 208 (step 512). Responsive to the service request, the producer NF 208 sends a service response with a service computing latency to the consumer NF 200 (step 514). The service computing latency indicates time elapsed since the service request is received by the producer NF 208 until the service response is sent by the producer NF 208.

In this embodiment, the consumer NF 200 optionally obtains a total service response latency measurement (step 516). Herein, the total service response latency measurement is a measurement of the service computing latency and a service transmission latency that indicates time elapsed since the service response is sent by the producer NF 208 until the service response is received by the consumer NF 200. As such, the total service response latency measurement is a measurement of time elapsed since the service request is sent by the consumer NF 200 until the service response is received by the consumer NF 200. Notice that if the service transmission latency is deemed to be negligible, the consumer NF 200 may measure the service computing latency at this step.

The consumer NF 200 then sends an event notification message to the NWDAF 304 (step 518), The event notification message includes the identification information that identifies the producer NF 208, the particular service of the producer NF 208, or both the producer NF 208 and the particular service of the producer NF 208. The event notification message may also include the service response latency measurement that is based on the service computing latency provided with the service response received from the producer NF 208, or the total service response latency measurement that is based on both the service computing latency and the service transmission latency. Furthermore, the event notification message may also include an event identifier, which indicates that the service response latency measurement is included in the event notification message.

Based on the service response latency measurement or the total service response latency measurement in the event notification message, the NWDAF 304 computes at least one statistic latency value (step 520). The at least one statistic latency value may be an average service response latency on a per NF and NF service basis, (b) a median service response latency, (c) a maximum service response latency, (d) a percentile service response latency, or (e) any two or more of (a)-(d). Alternatively, the at least one statistic latency value may be a total average service response latency on a per NF and NF service basis, (b) a total median service response latency, (c) a total maximum service response latency, (d) a total percentile service response latency, or (e) any two or more of (a)-(d). The NWDAF 304 sends a latency notification message to the NRF 302 (step 522). The latency notification message includes the at least one statistic latency value based on the service response latency measurement or the total service response latency measurement, and the identification information identifying the producer NF 208, the particular service of the producer NF 208, or both the producer NF 208 and the particular service of the producer NF 208.

Figure 6:
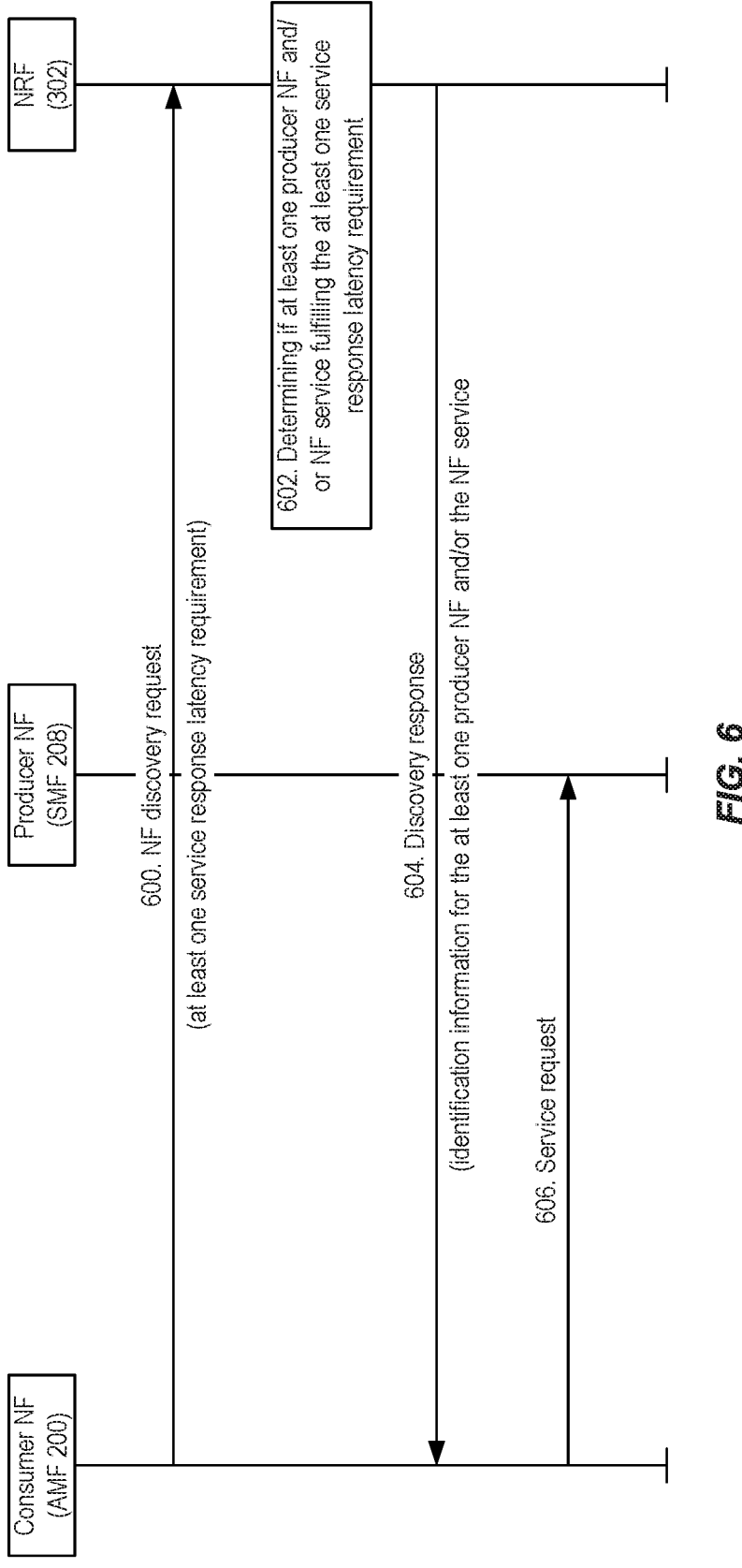
FIG. 6 illustrates embodiments of solutions for consumer NFs discovering producer NFs with certain service response latency requirements in accordance with some embodiments of the present disclosure.

FIG. 6 illustrates the operation of the cellular communications system 100 in accordance with another embodiment of the present disclosure. As illustrated, a consumer NF 200, which in this example is an AMF in a core network 110 of a cellular communications system 100, sends a NF discovery request to a NRF 302 (step 600). Herein the NF discovery request includes at least one service response latency requirement. In one example, the at least one service response latency requirement may indicate a maximum allowed value of a service computing latency for one producer NF in absolute or relative terms. The service computing latency for one producer NF is time elapsed since a service request is received by this producer NF until a service response is sent by this producer NF. In another example, the at least one service response latency requirement may indicate that the consumer NF 200 should send the service request to one producer NF, which has a lower service computing latency than at least another producer NF.

Furthermore, in another example, the at least one service response latency requirement may indicate a maximum allowed value of a total service response latency for one producer NF. The total service response latency for one producer NF includes the service computing latency and a service transmission latency that indicates time elapsed since the service response is sent by this producer NF until the service response is received by the consumer NF 200. As such, the total service response latency indicates time elapsed since the service request is sent by the consumer NF 200 until the service response is received by the consumer NF 200. In another example, the at least one service response latency requirement may indicate that the consumer NF 200 should send the service request to one producer NF, which has a lower total service response latency than at least another producer NF.

In this embodiment, the NRF 302 determines at least one producer NF that fulfills the at least one service response latency requirement, a particular service of the at least one producer NF that fulfills the at least one service response latency requirement, or both the at least one producer NF that fulfills the at least one service response latency requirement and the particular service of the at least one producer NF that fulfills the at least one service response latency requirement (step 602). Then the NRF 302 sends a discovery response to the consumer NF 200 (step 604). This discovery response includes identification information that identifies at least one producer NF that fulfills the at least one service response latency requirement, a particular service of the at least one producer NF that fulfills the at least one service response latency requirement, or both the at least one producer NF that fulfills the at least one service response latency requirement and the particular service of the at least one producer NF that fulfills the at least one service response latency requirement. In addition, the discovery response may also include at least one address for the at least one producer NF and/or the particular service of the at least one producer NF. At last, the consumer NF 200 sends a service request to a producer NF 208 among the at least one producer NF, which itself or the particular service of which fulfills the at least one service response latency requirement (step 606). In this example, the producer NF 208 may be a SMF in a core network 110 of a cellular communications system 100.

Figure 7:
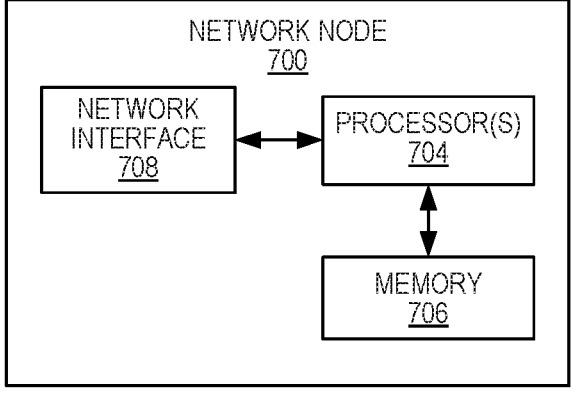
FIG. 7 is a schematic block diagram of a network node according to some embodiments of the present disclosure.

FIG. 7 is a schematic block diagram of a network node 700 according to some embodiments of the present disclosure. Optional features are represented by dashed boxes. The network node 700 may be, for example, a network node that implements the consumer NF 200 (e.g. AMF), the producer NF 208 (e.g. SMF), the NRF 302, or the NWDAF 304 having the functionality described herein. As illustrated, the network node 700 includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. The one or more processors 704 operate to provide one or more functions of the network node 700 as described herein (e.g., one or more functions of the consumer NF 200 (e.g. AMF), the producer NF 208 (e.g. SMF), the NRF 302, or the NWDAF 304 as described herein, e.g., with respect to FIG. 4, FIG. 5, and/or FIG. 6). In some embodiments, the function(s) are implemented in software that is stored, e.g., in the memory 706 and executed by the one or more processors 704.

Figure 8:
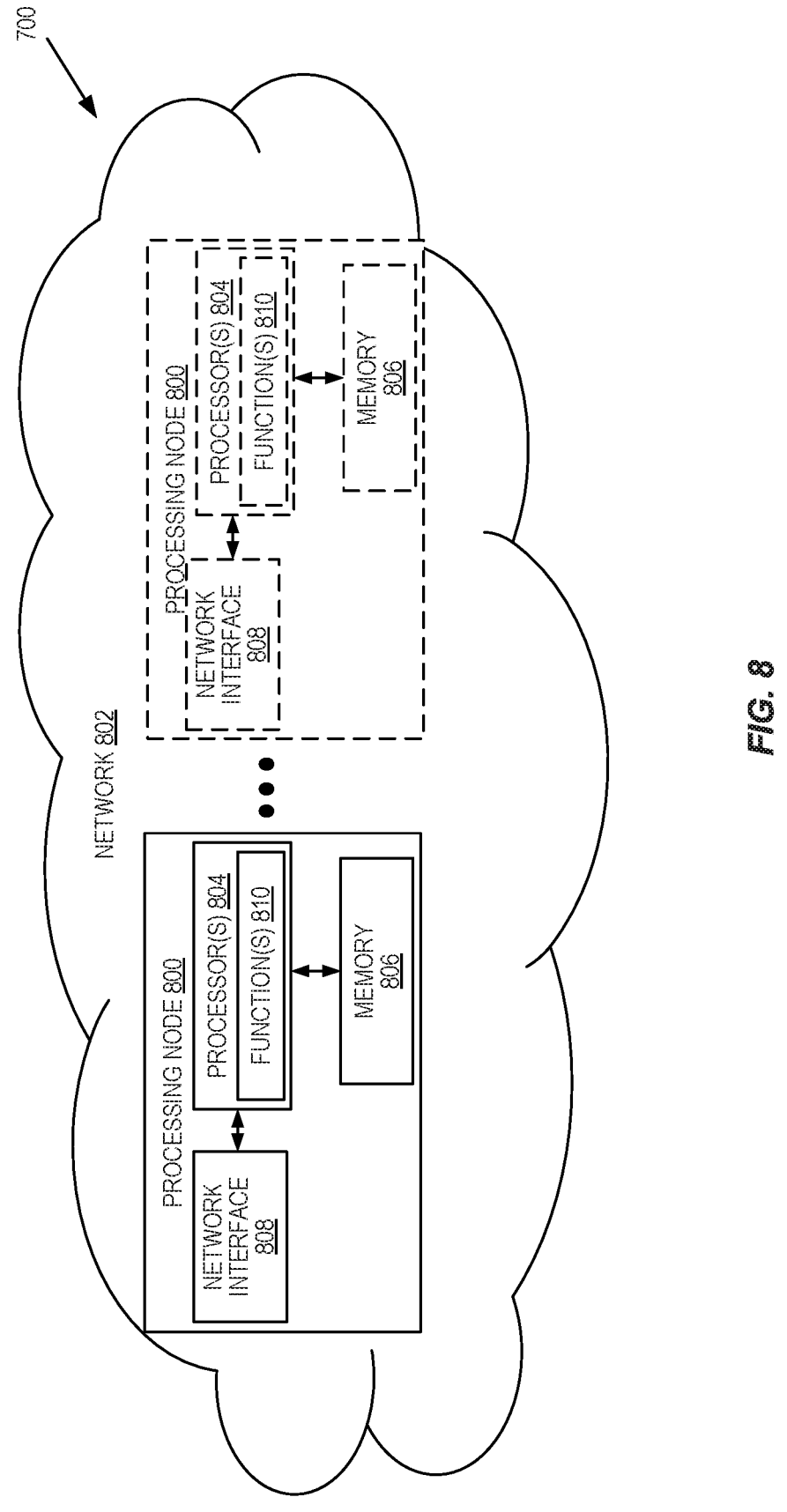
FIG. 8 is a schematic block diagram that illustrates a virtualized embodiment of the network node of FIG. 7 according to some embodiments of the present disclosure.

FIG. 8 is a schematic block diagram that illustrates a virtualized embodiment of the network node 700 according to some embodiments of the present disclosure. As used herein, a "virtualized" network node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 may include one or more processing nodes 800 coupled to or included as part of a network(s) 802. Each processing node 800 includes one or more processors 804 (e.g., CPUs, ASICs, FPGAs, and/or the like), memory 806, and a network interface 808.

In this example, functions 810 of the network node 700 described herein (e.g. one or more functions of the consumer NF 200 (e.g. AMF), the producer NF 208 (e.g. SMF), the NRF 302, or the NWDAF 304 as described herein, e.g., with respect to FIG. 4, FIG. 5, and/or FIG. 6) are implemented at the one or more processing nodes 800 in any desired manner. In some particular embodiments, some or all of the functions 810 of the network node 700 described herein are implemented as virtual components executed by one or more virtual machines implemented in a virtual environment(s) hosted by the processing node(s) 800.

In some embodiments, a computer program including instructions which, when executed by at least one processor, causes the at least one processor to carry out the functionality of the network node 700 or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
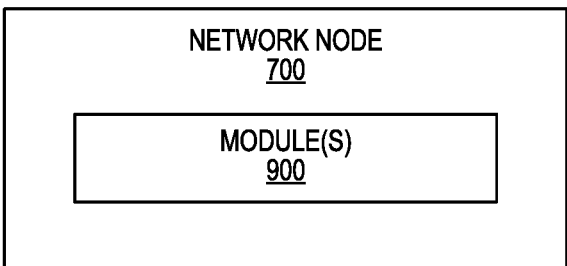
FIG. 9 is a schematic block diagram of the network node of FIG. 7 according to some other embodiments of the present disclosure.

FIG. 9 is a schematic block diagram of the network node 700 according to some other embodiments of the present disclosure. The network node 700 includes one or more modules 900, each of which is implemented in software. The module(s) 900 provide the functionality of the network node 700 described herein (e.g. one or more functions of the consumer NF 200 (e.g. AMF), the producer NF 208 (e.g. SMF), the NRF 302, or the NWDAF 304 as described herein, e.g., with respect to FIG. 4, FIG. 5, and/or FIG. 6). This discussion is equally applicable to the processing node 800 of FIG. 8 where the modules 900 may be implemented at one of the processing nodes 800 or distributed across multiple processing nodes 800.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
ASIC Application Specific Integrated Circuit
AUSF Authentication Server Function
CP Control Plane
CPU Central Processing Unit
DN Data Network
DSP Digital Signal Processor
eNB Enhanced or Evolved Node B
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NG-eNB Next Generation-Enhanced or Evolved Node B
NG-RAN Next Generation-Radio Access Network
NR New Radio
NRF Network Function Repository Function
NSSF Network Slice Selection Function
NWDAF Network Data Analytics Function
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head RTT Round Trip Time
SCEF Service Capability Exposure Function
SMF Session Management Function
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

What is claimed is:

1. A method of operation of a consumer Network Function, NF, that supports service response latency measurements in a core network of a cellular communications system, the method comprising:
   receiving, from a Network Data Analytics Function, NWDAF, an event subscription message for subscribing to the consumer NF for service response latency measurements, wherein the consumer NF is a different type of NF than the NWDAF;
   sending, to a producer NF, a service request for a particular service of the producer NF;
   receiving, from the producer NF, a service response with a service computing latency, wherein the service computing latency indicates time elapsed since the service request is received by the producer NF until the service response is sent by the producer NF; and
   sending, to the NWDAF, an event notification message comprising:
      identification information that identifies the producer NF, the particular service of the producer NF, or both the producer NF and the particular service of the producer NF; and
      a service response latency measurement that is based on the service computing latency provided with the service response received from the producer NF.

2. The method of claim 1, further comprising:
   sending, to a Network Function Repository Function, NRF, a NF register message that includes an indication that the consumer NF supports service response latency measurements; and
   receiving, from the NRF, an acknowledgement message to acknowledge registration of the consumer NF.

3. The method of claim 1, further comprising:
   sending, to a Network Function Repository Function, NRF, a NF discovery request for the particular service, wherein the NF discovery request includes an indication that the consumer NF supports service response latency measurements; and
   receiving, from the NRF, a discovery response including the identification information that identifies the producer NF, the particular service of the producer NF, or both the producer NF and the particular service of the producer NF.

4. The method of claim 1 further comprising obtaining a total service response latency measurement, wherein the total service response latency measurement is a measurement of time elapsed since the service request is sent by the consumer NF until the service response is received by the consumer NF, and the event notification message further comprises the total service response latency.

5. The method of claim 1, wherein the event notification message sent to the NWDAF further comprises an event identifier, which indicates that the service response latency measurement is included in the notification message.

6. A network node that implements a consumer Network Function, NF, in a core network of a cellular communications system, the network node comprising:
   a network interface; and
   processing circuitry associated with the network interface, the processing circuitry configured to cause the network node to:
      receive, from a Network Data Analytics Function, NWDAF, an event subscription message for subscribing to the consumer NF for service response latency measurements, wherein the consumer NF is a different type of NF than the NWDAF;
      send, to a producer NF, a service request for a particular service of the producer NF;
      receive, from the producer NF, a service response with a service computing latency, wherein the service computing latency indicates time elapsed since the service request is received by the producer NF until the service response is sent by the producer NF; and
      send, to the NWDAF, an event notification message comprising:
         identification information that identifies the producer NF, the particular service of the producer NF, or both the producer NF and the particular service of the producer NF; and
         a service response latency measurement that is based on the service computing latency provided with the service response received from the producer NF.

7. The network node of claim 6, wherein the processing circuitry is configured to cause the network node to:
   send to a Network Function Repository Function, NRF, a NF register message that includes an indication that the consumer NF supports service response latency measurements; and
   receive, from the NRF, an acknowledgement message to acknowledge registration of the consumer NF.

8. The network node of claim 6, wherein the processing circuitry is configured to cause the network node to:
   send to a Network Function Repository Function, NRF, a NF discovery request for the particular service, wherein the NF discovery request includes an indication that the consumer NF supports service response latency measurements; and
   receive, from the NRF, a discovery response including the identification information that identifies the producer NF, the particular service of the producer NF, or both the producer NF and the particular service of the producer NF.

9. The network node of claim 6, wherein the processing circuitry is configured to cause the network node to obtain a total service response latency measurement, wherein the total service response latency measurement is a measurement of time elapsed since the service request is sent by the consumer NF until the service response is received by the consumer NF, and the event notification message further comprises the total service response latency.

10. The network node of claim 6, wherein the event notification message sent to the NWDAF further comprises an event identifier, which indicates that the service response latency measurement is included in the notification message.

11. A method of operation of a Network Data Analytics Function, NWDAF, in a core network of a cellular communications system, the method comprising:
   sending, to a consumer Network Function, NF, an event subscription message for subscribing to the consumer NF for service response latency measurements, wherein the consumer NF is a different type of NF than the NWDAF; and receiving, from the consumer NF, an event notification message comprising:

identification information that identifies a producer NF, a particular service of the producer NF, or both the producer NF and the particular service of the producer NF; and a service response latency measurement, which at least includes a measurement of time elapsed since a service request of the particular service is received by the producer NF until a service response is sent by the producer NF.

12. The method of claim 11, further comprising:

computing at least one statistic latency value based on the service response latency measurement received from the consumer NF; and sending, to a Network Function Repository Function, NRF, a latency notification message, which includes the identification information and the at least one statistic latency value.

13. The method of claim 12, further comprising:

receiving, from the NRF, a latency subscription message for subscribing to the NWDAF for the computed at least one statistic latency value;

sending, to the NRF, a NF discovery message that includes an indication that eligible consumer NFs for NF discovery are consumer NFs that support service response latency measurements; and receiving, from the NRF, a list of the eligible consumer NFs that support service response latency measurement, wherein the consumer NF is included in the list of the eligible consumer NFs.

14. The method of claim 11 further comprising receiving, from the NRF, a latency subscription message for subscribing to the NWDAF for the computed at least one statistic latency value, wherein the latency subscription message includes an address of the consumer NF.

15. The method of claim 11, wherein the at least one statistic latency value, which is computed based on the service response latency measurement received from the consumer NF, comprises: (a) an average service response latency, (b) a median service response latency, (c) a maximum service response latency, (d) a percentile service response latency, or (e) any two or more of (a)-(d).

16. The method of claim 11, wherein the event notification message received from the consumer NF further comprises an event identifier, which indicates that the service response latency measurement is included in the notification message.

17. A network node that implements a Network Data Analytics Function, NWDAF, in a core network of a cellular communications system, the network node comprising:

a network interface; and processing circuitry associated with the network interface, the processing circuitry configured to cause the network node to:

send, to a consumer Network Function, NF, an event subscription message for subscribing to the consumer NF for service response latency measurements wherein the consumer NF is a different type of NF than the NWDAF; and receive, from the consumer NF, an event notification message comprising:

identification information that identifies the producer NF, the particular service of the producer NF, or both the producer NF and the particular service of the producer NF; and a service response latency measurement, which at least includes a measurement of time elapsed since a service request of the particular service is received by the producer NF until a service response is sent by the producer NF.

18. The network node of claim 17, wherein the processing circuitry is configured to cause the network node to:

compute at least one statistic latency value based on the service response latency measurement received from the consumer NF; and send, to a Network Function Repository Function, NRF, a latency notification message, which includes the identification information and the at least one statistic latency value.

19. The network node of claim 17, wherein the processing circuitry is configured to cause the network node to:

receive, from the NRF, a latency subscription message for subscribing to the NWDAF for the computed at least one statistic latency value;

send, to the NRF, a NF discovery message that includes an indication that eligible consumer NFs for NF discovery are consumer NFs that support service response latency measurements; and receive, from the NRF, a list of the eligible consumer NFs that support service response latency measurement, wherein the consumer NF is included in the list of the eligible consumer NFs.

20. The network node of claim 17, wherein the processing circuitry is configured to cause the network node to receive, from the NRF, a latency subscription message for subscribing to the NWDAF for the computed at least one statistic latency value, wherein the latency subscription message includes an address of the consumer NF.

* * * * *